US007162418B2

(12) United States Patent
Leichtling et al.

(10) Patent No.: US 7,162,418 B2
(45) Date of Patent: Jan. 9, 2007

(54) PRESENTATION-QUALITY BUFFERING PROCESS FOR REAL-TIME AUDIO

(75) Inventors: Ivan J. Leichtling, Redmond, WA (US); Ido Ben-Shachar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 10/002,863

(22) Filed: Nov. 15, 2001

(65) Prior Publication Data

US 2003/0093267 A1 May 15, 2003

(51) Int. Cl.
*G10L 11/02* (2006.01)
*H04L 12/56* (2006.01)

(52) U.S. Cl. ....................... 704/215; 370/394; 370/412

(58) Field of Classification Search ................ 704/248, 704/215, 201; 370/394, 333, 352, 517; 709/214, 709/231

See application file for complete search history.

(56) References Cited

U.S. PATENT DOCUMENTS 4,588,857 A 5/1986 Arsem (Continued)

FOREIGN PATENT DOCUMENTS

| | | |
|---|---|---|
| JP | 403225642 A | 10/1991 |
| JP | 407014016 A | 1/1995 |
| JP | 408023526 A | 1/1996 |
| JP | 02000350173 A | 12/2000 |

OTHER PUBLICATIONS

Hilt, Volker, et al., "*A Light-Weight Repair Protocol for the Loss-Free Recording of MBone Sessions*", in Proceedings of the 21st International Conference on Distributed Computing Systems Workshops, Mesa, Arizona, Apr. 16-19, 2001, *IEEE Computer Society*, pp. 63-68.

(Continued)

*Primary Examiner*—V. Paul Harper
(74) *Attorney, Agent, or Firm*—Perkins Coie LLP

(57) ABSTRACT

A buffering process for real-time digital audio is provided to effect of network "jitter" from inconsistent network packet delivery rates. The buffering algorithm is particularly useful for audio data including distinct bursts separated by silence, such as speech. The process holds incoming audio packets in a queue until either: (a) the buffer contents meet a predetermined threshold; or (b) the end packet of a burst is received. The result is that silent periods between bursts may expand or decrease relative to the original audio pattern, allowing cumulative jitter to be played out as silence. The threshold is sized such that the deviation in silence is unnoticeable by a listener. In an optional embodiment, the process periodically adjusts the threshold to adapt to network conditions.

24 Claims, 8 Drawing Sheets

U.S. PATENT DOCUMENTS

| | | | | |
|---|---|---|---|---|
| 5,586,172 | A | 12/1996 | Sakurai et al. | |
| 5,710,591 | A | 1/1998 | Bruno et al. | |
| 5,872,789 | A * | 2/1999 | Orleth et al. | 370/517 |
| 6,141,324 | A * | 10/2000 | Abbott et al. | 370/236 |
| 6,226,668 | B1 | 5/2001 | Silverman | |
| 6,233,317 | B1 | 5/2001 | Homan et al. | |
| 6,301,258 | B1 * | 10/2001 | Katseff et al. | 370/412 |
| 6,360,271 | B1 * | 3/2002 | Schuster et al. | 709/231 |
| 6,434,606 | B1 * | 8/2002 | Borella et al. | 709/214 |
| 6,665,283 | B1 * | 12/2003 | Harris et al. | 370/333 |
| 6,665,317 | B1 * | 12/2003 | Scott | 370/516 |
| 6,782,363 | B1 * | 8/2004 | Lee et al. | 704/248 |
| 6,801,532 | B1 * | 10/2004 | Anandakumar et al. | 370/394 |
| 6,977,942 | B1 * | 12/2005 | Raisanen | 370/429 |
| 2004/0120309 | A1 * | 6/2004 | Kurittu et al. | 370/352 |

OTHER PUBLICATIONS

Holfelder, Wieland, "*Interactive remote recording and playback of multicast videoconferences*", Computer Communications 21 (1998) pp. 1285-1294.

Lambrinos, Lambros, et al., "*The Multicast Multimedia Conference Recorder*", in the Proceedings of the 7th International Conference on Computer Communications and Networks, Lafayette, Louisiana, Oct. 12-15, 1998, *IEEE Computer Society*, pp. 208-213.

* cited by examiner

PRESENTATION-QUALITY BUFFERING PROCESS FOR REAL-TIME AUDIO

TECHNICAL FIELD

This invention relates generally to communications over computer networks and more particularly relates to a method for buffering real time audio data.

BACKGROUND OF THE INVENTION

Real-time audio presentations given over the Internet are becoming increasingly popular. Digital audio data sent over the Internet is delivered in a compressed, packetized form, and each packet must be received, decompressed, and then played back by a listener's computer. If any audio packet is not received, decompressed, and sent to playback before the immediately preceding packet has played to completion, there will be an audible break in the audio.

Because data flow over computer networks is inherently inconsistent, packets can be transmitted at a rate slightly different from a rate at which the audio is generated by a sender. "Jitter" is generally a lag time between the actual and expected arrival times of an audio data packet relative to a prior packet, and the occurrence of jitter results in audible breaks or degraded sound quality.

In a non-real-time application, the effect of jitter can be corrected by buffering audio data for several seconds or several minutes before starting playback. Timeliness is not critical for non-real-time applications. Unfortunately, such a lengthy buffering period is not suitable for "real-time" applications in which audio must be delivered in a very timely fashion. For example, a buffering period of even a few seconds can make a conversation awkward, and a long buffering period would significantly impair the ability to effectively converse. Real-time applications strive to make each step of audio capture and playback as fast as possible, thus leading to a much smaller tolerance for the variance in delivery times of audio packets. If audio data is rendered as soon as it is received, the audio heard will contain audible skips and clicks.

While buffering methods according to the prior art provide a number of advantageous features, they nonetheless have certain limitations. The present invention seeks to overcome certain drawbacks of the prior art and to provide new features not heretofore available.

SUMMARY OF THE INVENTION

Some forms of audio data are "bursty"—having bursts of audio separated by periods of silence. For example, speech is a bursty form of audio, but music or other non-broken sounds are not bursty. The present invention is particularly useful for buffering bursty audio, particularly speech, which is to be transmitted in real time.

A method of buffering is provided which plays audio bursts through a short data queue to eliminate jitter with an unnoticeable delay, and wherein the silent period between consecutive bursts can be adjusted in length. Effectively, each burst can be played at a slightly shifted time relative to the previous and/or subsequent bursts to compensate for cumulative jitter. As a result, the audio can be delivered in a timely fashion yet still have a high quality suitable for presentations which could previously be achieved only with significant buffering latency.

In general, the buffering process includes parameters such that the queued audio packets are not released for playback until it is reasonable to expect that silence will not be injected into a burst. In an exemplary embodiment, the method includes adding incoming packets of audio data in a buffer in an order generated, detecting when the buffer contains an amount of audio data which matches a predetermined threshold amount, detecting when a burst has ended, and playing the audio data contained in the buffer either when the buffer contents have reached the predetermined threshold, or when a burst has ended. In other words, after a burst has been played to completion, the buffer can begin playing the next burst right away if the "threshold" amount of the next burst has already arrived at the buffer. Otherwise, the buffer will wait to receive more of the next burst before starting to play it.

Jitter is effectively removed from the audio data which passes through the buffer and moved to silent periods between bursts, thereby allowing each distinct audio burst to be played smoothly by a recipient. Because cumulative jitter time is "played" as silence, the sound quality of each burst is improved.

If the buffering time and threshold levels are set appropriately, the listener will not notice the resulting time shifts. In the case where the audio is speech, the adjustment of the silent periods is so slight that the listener will not suspect that the speech pattern has been altered relative to the originally spoken data pattern.

In an embodiment, the buffering period is selected small enough to not disrupt conversational two-way communications. For example, a buffering period of less than 150 ms is desirable in order to avoid perceptible delays in a "real-time" conversation. However, the buffering period can be set at any length which provides a suitable balance between latency and jitter reduction.

The predetermined threshold amount can be fixed or variable. For example, in an embodiment, the threshold value is initially at a default value and then periodically reset. In an embodiment, the threshold value may be periodically reset by measuring respective jitter times between packets received within each burst or another sample period, calculating an average jitter between the packets in the burst and resetting the threshold to an adjusted threshold time at slightly longer than the average jitter time. In another embodiment, the threshold value is periodically adjusted by measuring the average burst length and resetting the threshold to accommodate an average burst. It is noted that such threshold adjusting is useful for reasonably short and average bursts, because the threshold should preferably increased only to a period which is within acceptable latency parameters. For example, an average burst could be three seconds long, but a three second latency would be undesirably annoying to a listener.

In an optional embodiment, the method further comprises the step of waiting for a predetermined minimal silence period after detecting an end packet before playing subsequent packets.

By allowing the silent period to be shortened, the method advantageously permits the played audio track to catch up from cumulative jitter removed from the preceding played burst. By allowing the silent period to be lengthened, the method advantageously hides jitter contained in a burst waiting to be played. Under typical speech and network conditions, a recipient playing the buffered audio does not notice whether a period of silence between played bursts has been altered in length.

An advantage of the present invention is that it provides an improved method of buffering audio data.

Another advantage of the present invention is that it provides a buffering method which improves the quality of real-time transmissions of bursty audio.

A further advantage of the present invention is that it provides a buffering method which hides cumulative jitter among silence which separates audio bursts.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
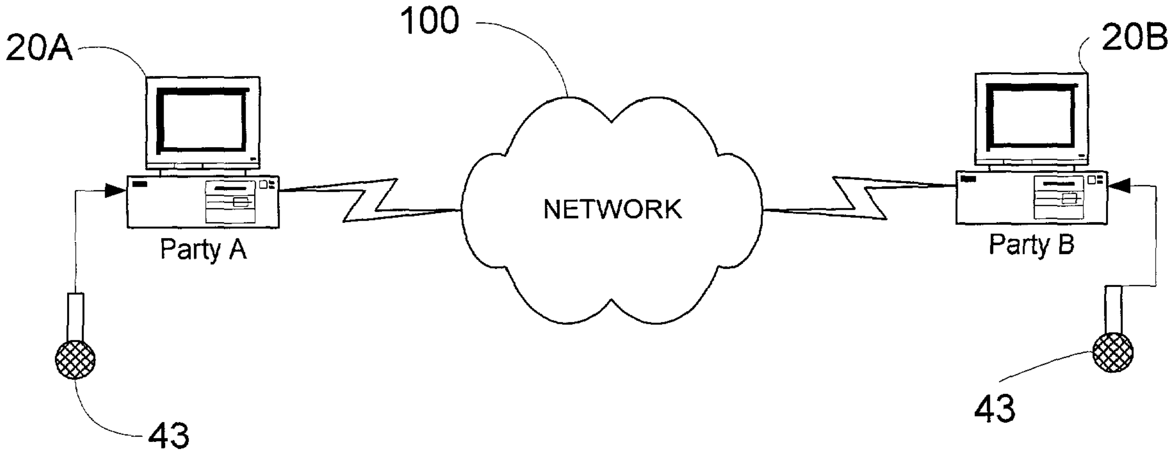
FIG. 1 is a schematic diagram generally illustrating an exemplary network environment in which the present invention could be implemented, the network including computers communicating over the Internet.

Turning to the drawings, wherein like reference numerals refer to like elements, the invention is described hereinafter in the context of a suitable computing environment.

FIG. 1 illustrates an exemplary computer network including computers 20A and 20B, representing communicating parties A and B, respectively. The computers 20A and B are in communication with each other over a network 100 for a real-time exchange of audio data. For example, parties A and B may be engaged in a telephone conversation, a video conference, or a "live" audio feed. Each of the computers 20A and 20B can be a PC, telephone, or any computerized device connected over land lines or wireless connections. Each of the computers 20A and 20B which captures audio to be sent over the network 100 is equipped with a respective microphone 43. Those of skill in the art will understand that more than two parties may be connected in a conference communication or presentation over the network 100.

Although it is not required for practicing the invention, the invention is described as it is implemented by computer-executable instructions, such as program modules, that are executed by a PC (PC). Generally, program modules include routines, programs, objects, components, data structures and the like that perform particular tasks or implement particular abstract data types.

The invention may be implemented in computer system configurations other than a PC. For example, the invention may be realized in hand-held devices, multi-processor systems, microprocessor-based or programmable consumer electronics, network PCs, minicomputers, mainframe computers and the like. The invention may also be practiced in distributed computing environments, where tasks are performed by remote processing devices that are linked through a communications network. In a distributed computing environment, program modules may be located in both local and remote memory storage devices. Although the invention may be incorporated into many types of computing environments as suggested above, the following detailed description of the invention is set forth in the context of an exemplary general-purpose computing device in the form of a conventional PC 20.

Before describing the invention in detail, the computing environment in which the invention operates is described in connection with FIG. 2.

The PC 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the PC 20, such as during start-up, is stored in ROM 24. The PC 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the PC 20 through input devices such as a keyboard 40 and a pointing device 41. In an embodiment wherein the PC 20 participates in a multimedia conference as one of the attendee computers 20A–20C (FIG. 1), the PC also receives input from a microphone 43. Other input devices (not shown) may include a video camera, joystick, game pad, satellite dish, scanner, or the like. These and other input devices are often connected to the processing unit 21 through a serial port interface 44 that is coupled to the system bus 23, but may be connected by other interfaces, such as a parallel port, game port or a universal serial bus (USB). A monitor 45 or other type of display device is also connected to the system bus 23 via an interface, such as a video adapter 46. In addition to the monitor, the PC includes a speaker 47 connected to the system bus 23 via an interface, such as an audio adapter 48. The PC may further include other peripheral output devices (not shown) such as a printer.

Figure 2:
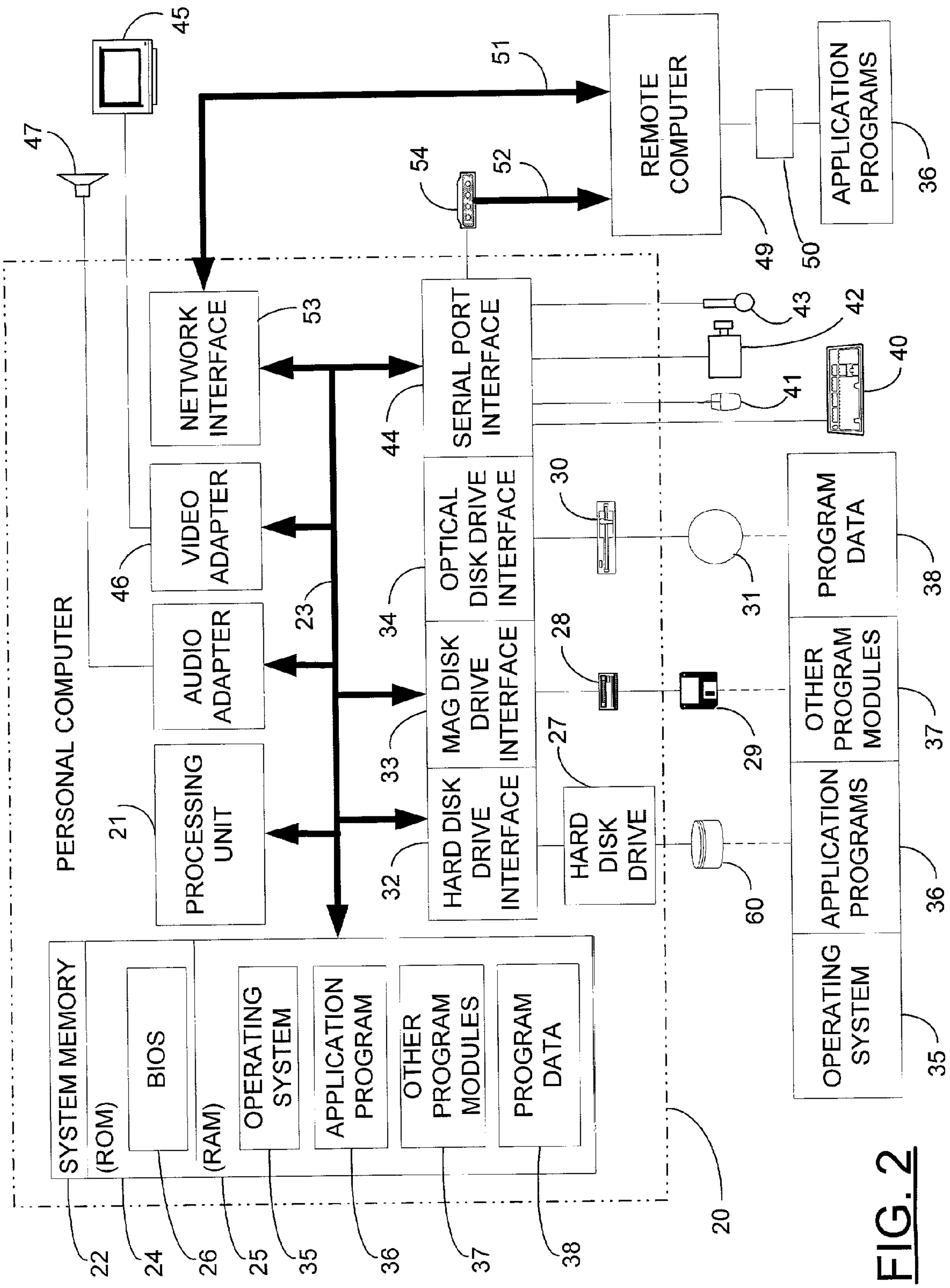
FIG. 2 is a block diagram generally illustrating an exemplary computer system on which the present invention can be implemented.

The PC 20 of FIG. 2 may operate in the network environment using logical connections to one or more remote computers, such as a remote computer 49 which may represent another PC, for example, a router, a LAN server, a peer device, a client device, etc. The remote computer 49 typically includes many or all of the elements described above relative to the PC 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the PC 20 is connected to the local network 51 through a network interface or adapter 53. When used in a WAN networking environment, the PC 20 typically includes a modem 54 or other means for establishing communications over the WAN 52. The modem 54, which may be internal or external, is connected to the system bus 23 via the serial port interface 44. In a networked environment, program modules depicted relative to the PC 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that variations of the acts and operations described hereinafter may also be implemented in hardware.

In the case wherein the audio data is speech, a burst is a sound, word or succession of words spoken together in continuous a manner. The beginning and end of each burst is defined by silence. As used herein, the term "silence" may be a very short period or a long period. For example, silence may occur between distinctly spoken words or in any pause during a person's speech. Those skilled in the art will understand that "silence" is not usually a condition of zero-input to the microphone, and that as the term "silence" as used herein represents a condition which does not meet selected amplitude and/or frequency properties. For example, a silence detector should be set to recognize that silence contains at least expected ambient noise. It is also noted the algorithm is not particularly useful for conditions of high background noise, such as loud music, in which the silence detector cannot adequately distinguish speech bursts from the background sounds.

According to an aspect of the invention, an audio buffering process holds data in a short buffer to remove "jitter," and the packets are placed in a queue and either held or forwarded according to alternating "play" and "pause" modes. More specifically, incoming packets of audio data are added to a buffer and, in the "pause" mode, the packets are held in a queue. The buffer is flushed in the "play" mode by releasing all packets in the queue at a normal rate when either: (a) the buffer contains an amount of data that matches a predetermined threshold; or (b) the end packet of a burst is received. It is noted that to play packets at a "normal rate" means to play audio at the same sampling rate at which the recording was made, i.e., one second of audio played represents one second of audio as recorded. The result is to slightly expand or decrease the periods of silence between bursts relative to the original audio pattern, allowing cumulative jitter to be played out as silence before or after a burst is played. In an embodiment, the threshold is sized such that the deviation in silence is unnoticeable by a listener and such that the buffering delay is nominal. This is particularly desirable for audio which is to be played with a corresponding video stream, if any, to maintain a match between the audio and video.

Figure 3A:
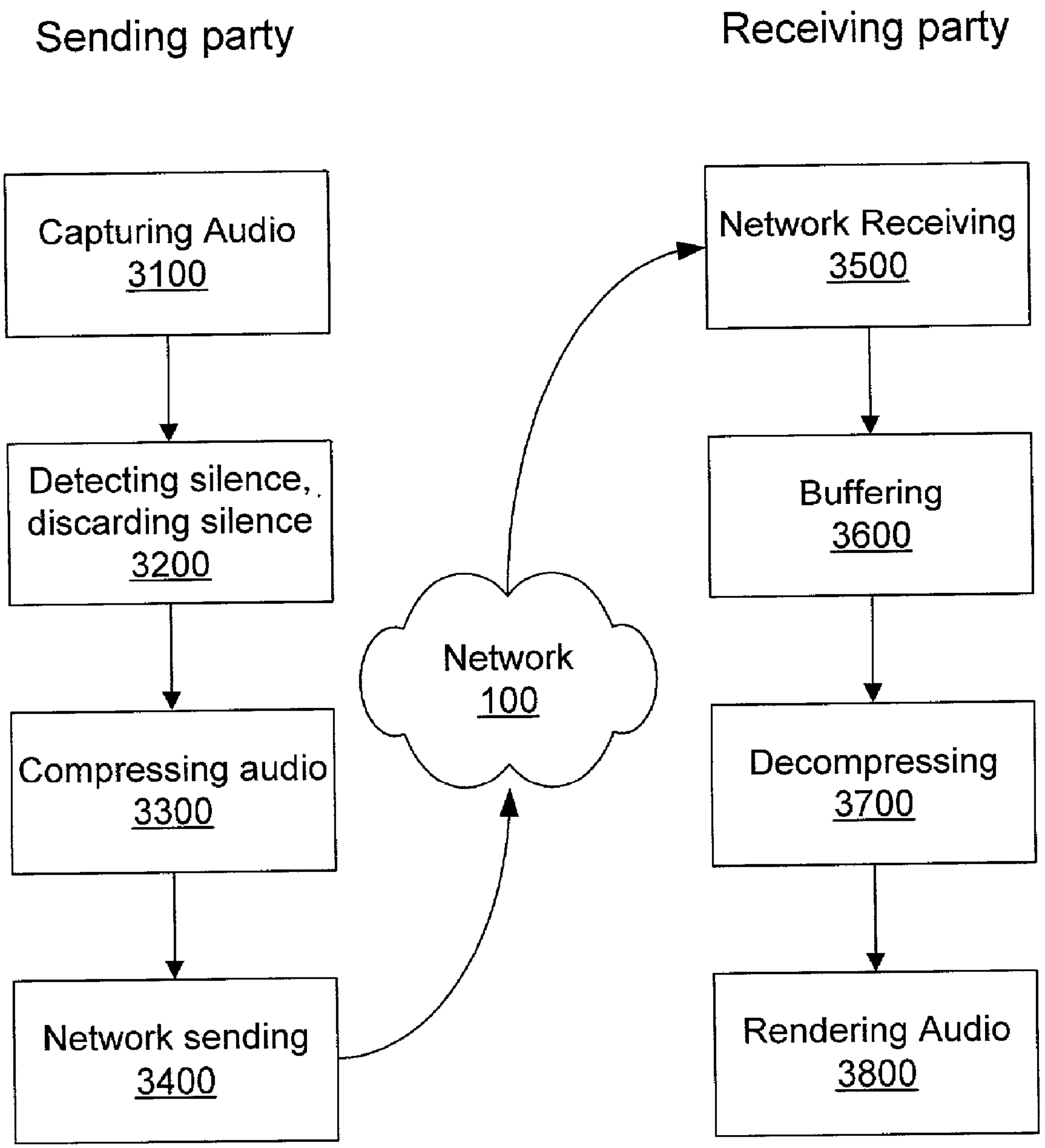
FIG. 3*a* is a flow chart of an exemplary method of processing audio from the initial capturing of audio by a sending party, illustrated at the left, through the final rendering of the audio to a receiving party, illustrated at the right, the method including the buffering process.

FIG. 3*a* illustrates the general processing of audio from its creation to a playing to a listener. Steps 3100–3400 on the left side of FIG. 3 are performed at the computer of a sending party, and steps 3500–3800 on the right side of FIG. 3 are performed at the computer of a receiving party. The arrows generally indicate data flow. Initially, audio is captured at step 3100, in a generally known manner. During the capture step, the analog audio input (such as words spoken into the microphone 43 of FIG. 1) is converted into digital data. Various capture methods may be used, including pulse code modulation (PCM). The audio data is captured in a series of packets. A packet can range in size, but a packet containing about 20 to 80 milliseconds of audio has been found suitable for use herein.

To define data bursts from a sound pattern source to be transmitted, silence is detected at step 3200. Various silence detection methods are known, and the silence detection 3200 can be integrated with the PCM capturing step 3100. The silence detector analyzes the PCM data and determines whether the data represents either audible audio, or silence, based upon one or more parameters. If the data represents silence, the data is discarded at step 3200. Otherwise, if the data is audible, it is forwarded for compression at step 3400 by an appropriate compression/decompression (codec) algorithm. Any appropriate codec may be used, and as those skilled in the art will know that many suitable codecs are readily available.

At step 3300, the compressed audio packets are sent over the network 100 to remote endpoints, according to appropriate protocols. For example, T.120 protocol is a suitable, well-known conferencing protocol. Additionally, the data is sent according to a suitable network protocol, such as TCP/IP. The transmitted data is received from the network at step 350, according to compatible protocols.

Step 3600 is the buffering process, which will be described below in greater detail in conjunction with FIG. 3*b*. After the audio packets are buffered by step 3600, still referring to FIG. 3*a*, the packets are decompressed at step 3700 according to the codec algorithm. The decompressed data is then played to the listener in a rendering step 3800. The rendering step 3800 includes converting the digital audio data to an analog form to be played by an output device, such as a speaker.

Figure 3B:
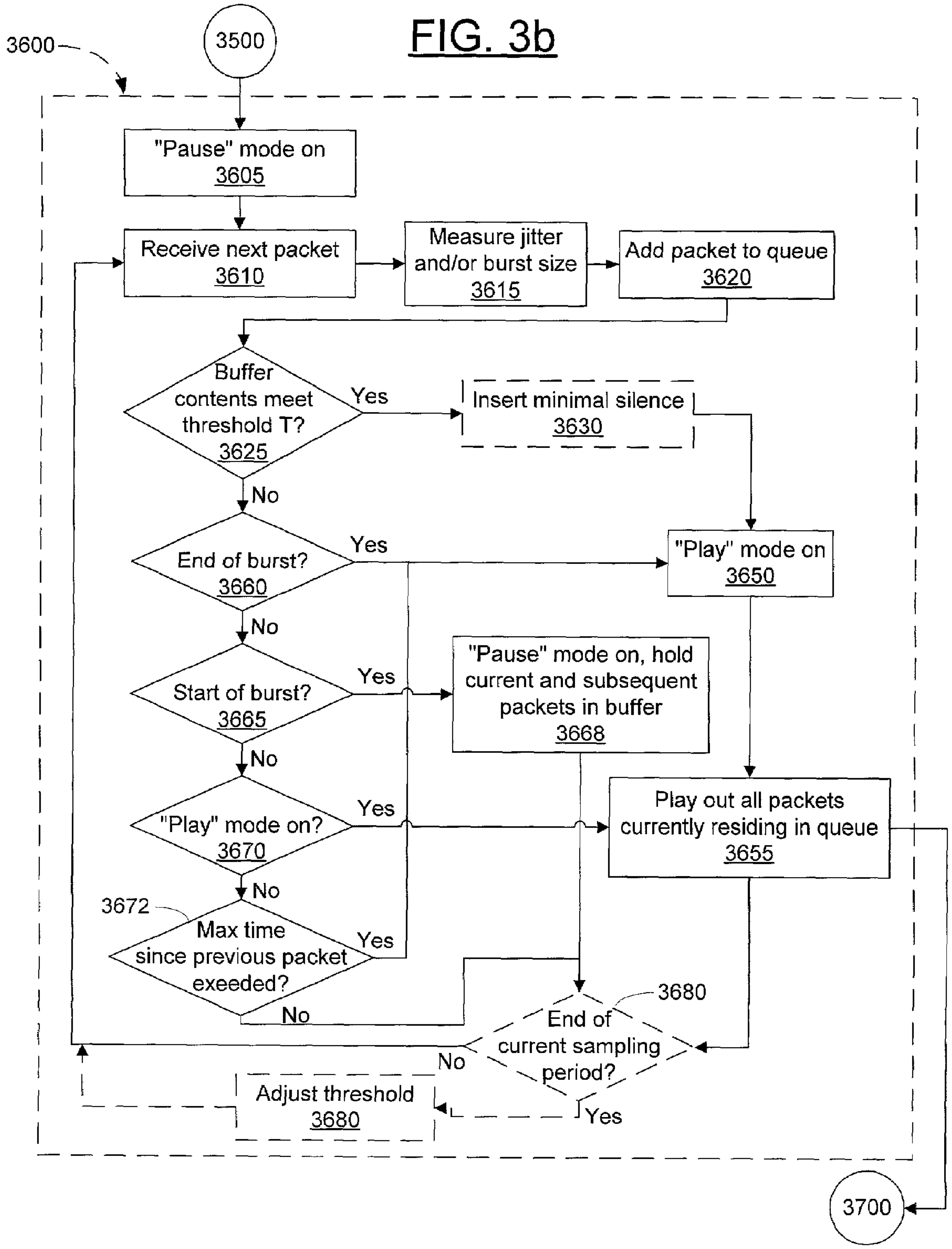
FIG. 3*b* is a flow chart of an exemplary buffering process according to teachings of the present invention.

Turning to FIG. 3*b*, an exemplary embodiment of the buffering process 3600 is illustrated as a flow chart. Initially, step 3605 sets the buffer in a "pause" mode, whereby the buffer holds and does not forward data. The buffer basically alternates between the "pause" mode and a "play" mode, which will be described below in connection with step 3650 and 3655. A loop begins at step 3610, whereby the buffer receives a next packet.

The buffer can have a fixed threshold, or in an embodiment, the threshold can be varied to meet network jitter conditions. Step 3615 measures information which may be used to periodically tune (i.e., resize) the buffer in order to adequately remove jitter according to current network conditions, as will be explained below in connection with steps 3675 and 3680. For example, measurements taken at step 3615 can include (a) an amount of "jitter" which is generally the time delay between when a packet was expected and when it actually arrived and/or (b) burst size. Additionally, the jitter time measured at step 3615 checked to eventually forward held audio in the event of an unusually lengthy skip occurs between packets, as will be discussed below in connection with step 3672.

The current packet is added to a queue at step 3620. Now, based upon various parameters, the buffering process determines whether to initiate the "play" mode and forward the current and preceding packets in the queue, or to merely hold the queue. In the illustrated example, steps 3625 and 3660 determine the "play" mode initiation parameters.

At step 3625, the buffering process checks whether the queued packets comprising the buffer contents, including the current packet, meet a predetermined threshold T. The threshold T generally defines the length of time of audio data which the buffer will hold. In either case, if the buffer contents meet the threshold T at step 3625, the "play" mode is initiated at step 3650, which causes the buffered audio to be played. More specifically, at step 3655, any audio packets residing in the queue, including the current packet, are appropriately played out from the buffer at a normal rate for subsequent processing. In the exemplary embodiment illustrated in FIG. 3*a*, packets released from the buffer are forwarded to the decompressing step 3700 of the process of FIG. 3*a*, and ultimately the rendering step 3800.

If the threshold T is fixed, it is preset at a suitable value. For example, a fixed threshold of 150 ms may be suitable. In a tunable-threshold embodiment, to be explained below in connection with steps 3675 and 3680, an initial value of the threshold T can be set at a lower initial value, e.g., 0 ms, 10 ms, etc. Because buffering introduces a tradeoff between latency and jitter reduction, the value of T is carefully selected to optimize the benefits while keeping T as low as possible. The particular environment of the application may affect how much latency is acceptable, and the tolerable threshold value can be set accordingly. For "presentation quality" audio, such as an organized meeting, it is desirable to keep T at a significant level above 0. As the level of interactivity increases, the acceptable latency tends to decrease, and T can be set quite low. Moreover, if there is an accompanying video stream, T should be low, or the video can be delayed to match T. If the buffer is full to threshold T at step 3625, it is assumed that either (a) the entire burst is contained in the buffer; or (b) a previous portion of the burst was already released from the buffer because the buffer limit was previously reached. In the former case, the burst can be sent to be played with zero jitter, since all packets in the burst are present and can be released from the buffer at an even flow.

In an embodiment, after the buffer contents have determined to meet the threshold T at step 3625, and prior to playing the current packet at step 3655, a minimal amount of silence is optionally inserted at step 3630. Generally, step 3630 operates to force a predetermined period of "silence" between back-to-back audio bursts which have played through the buffer quickly. If desired, this effect may avoid an otherwise rapid or continuous quality to some of the audio bursts. Step 3630 makes no adjustment to if the silence is greater than the selected minimal silence period. Specifically, if the time since the previous "pause" was initiated is already greater than the selected minimal silence period, step 3630 inserts no additional silence.

Figure 3C:
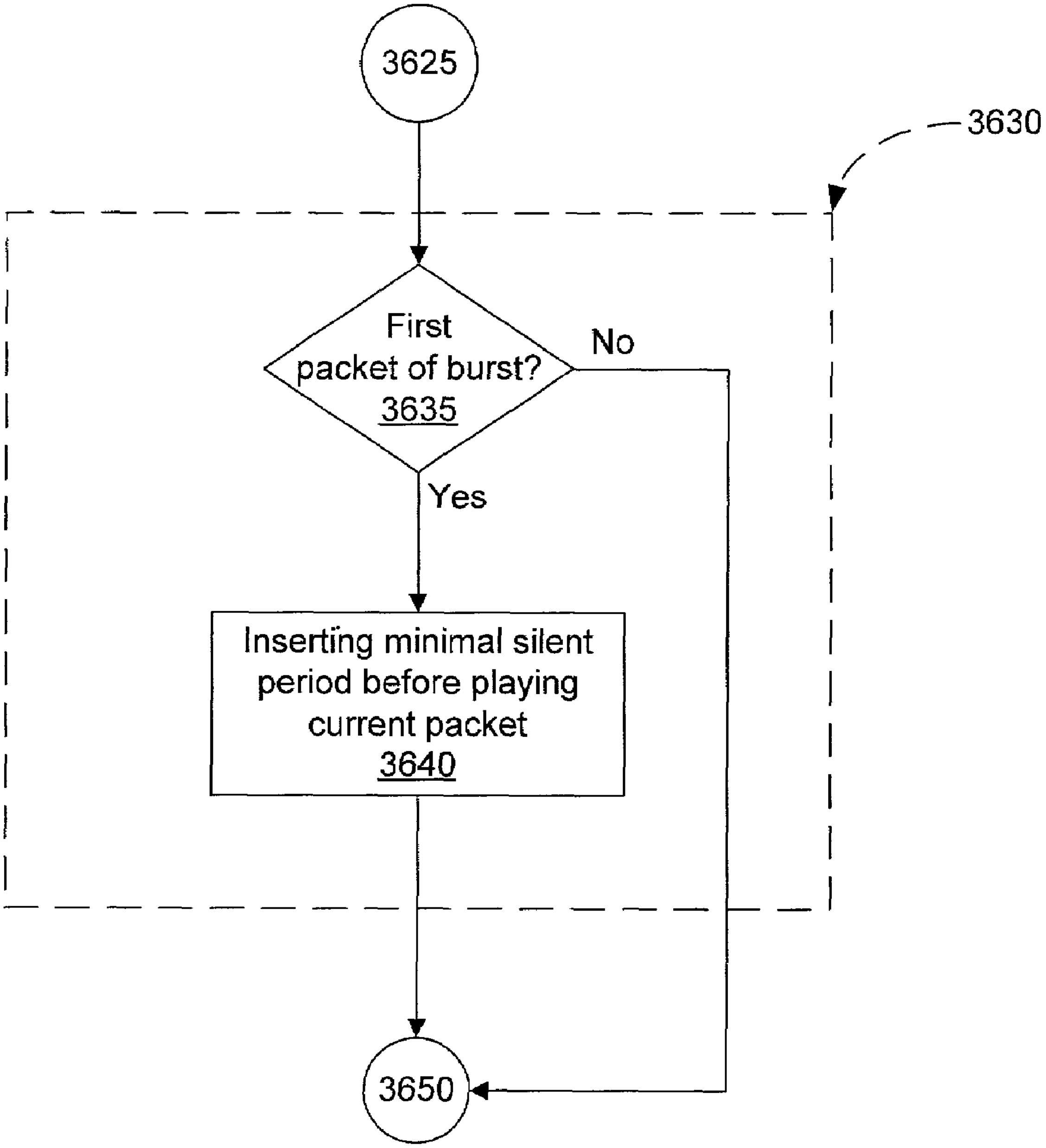
FIG. 3*c* is a flow chart of showing steps comprising an optional feature of the buffering process of FIG. 3*b* to insert a minimal silence between bursts.

Referring to FIG. 3*c*, an exemplary minimal silence step 3630 is illustrated in expanded form. First, step 3635 determines whether the current packet is a first packet of a burst. For example, step 3635 can assume that the next packet after a period of silence is a first packet of a burst. Alternatively, step 3635 can detect whether a packet contains a "start" flag. If the current packet is not a first packet of a burst, it would not be desirable to insert silence, and step 3635 accordingly passes the current packet to step 3650 to be played. However, if the current packet is a first packet, step 3635 passes the packet to step 3640, which inserts a predetermined period of "silence" after the end of the previous audio packet before forwarding the current packet from the buffer to step 3650 for playing. Any period of minimal silence can be inserted, but a minimal silence of about 50 ms has been found to provide a suitable gap between bursts. It should be understood that step 3640 preferably considers a measured period of received "silence" between bursts and inserts a corresponding supplemental period of "silence" for a total silence equal to the selected minimal silence. For example, if the period between the end of a burst and the beginning of a new burst (the period since the previous "pause" mode was initiated) is 20 ms, step 3650 would insert 30 ms in order to result in the predetermined minimal silence of 50 ms.

In order to immediately play out all buffered data from a burst which has been fully received, the buffering process 3600 initiates the "play" mode when the received packet is an end of a burst. Referring to FIG. 3*b*, if the buffer contents do not meet the threshold at step 3625, step 3660 determines whether the current packet is the end packet of a burst. For example, step 3660 checks whether the packet contains an end flag. If so, step 3665 instructs the buffer to resume "pause" mode, not for the current packet, but with respect to the next packet to be received, which will presumably be the first packet of a new burst. "Play" mode for the current packet is confirmed at step 3650, and step 3655 releases all packets residing in the queue, plus current packet, to be forwarded and played.

When the buffer is not full (step 3625), the buffering process initiates the "pause" mode upon receipt of a new burst. With reference to FIG. 3*b*, step 3665 determines whether the current packet is the beginning of a new burst. In the manner discussed above in connection with step 3635 of FIG. 3*c*, step 3665 can determine the start of a burst in various ways. For example, step 3665 can assume that the first packet received after an end packet (which is necessarily followed by silence) is the start of a new burst. Alternatively, step 3665 can detect whether a packet contains a "start" flag. If step 3665 determines that the current packet is a start of a burst, the buffer switches to "pause" mode at step 3668.

To keep the buffering latency low enough for "real-time" audio, the threshold T is typically set small enough that at least some bursts will begin to play out of the buffer before the rest of the burst has arrived. In such a situation, it is expected that subsequent buffers will arrive in time to be played through in a consistent manner. Accordingly, in order to immediately play audio which is part of a burst that has already begun playing through the buffer, still referring to FIG. 3*b*, if a current packet arrives at a moment when the buffer contents have not met the threshold T (step 3625), if the current packet is not an end packet of a burst (step 3660), and if the current packet is not a start of a burst (step 3665), step 3670 checks whether the buffer is currently in "play" mode. If step 3670 determines that the "play" mode is already on, the current packet is part of a burst that is already being played. To avoid any jitter or skips in the rendered audio, the current packet is immediately positioned behind any other previous packets and played at step 3655. If, on the other hand, the buffer is not in "play" mode at step 3670, the current packet is merely held in the buffer as positioned in the queue at step 3620.

On occasion, it is possible that a very large skip or jitter period will occur between the receipt of packets. To avoid indefinitely holding buffered audio when the buffer is in the "pause" mode, step 3672 checks the jitter time measured at step 3615 and determines whether a predetermined maximum time (n ms) has been exceeded since the arrival of the previous packet. If the current jitter period exceeds the maximum time, the "play" mode is switched on at step 3650 and all of the packets held in the queue are played out at step 3655. If the current jitter period has not exceeded the maximum time, the next packet is received at step 3610, after the optional application of the optional threshold adjustment step 3675. The safeguard step 3672 advantageously ensures that all received data will be played from the buffer in the event of an unusual transmission glitch.

After 3625, 3660, 3665 3670 and/or 3672 determine the "pause" or "play" status of the current packet and the buffer contents, the next packet is received at step 3610 and processed as described. However, before the newly received packet is received at step 3610 and subsequently evaluated, the buffering process of FIG. 3*b* can optionally include a dynamic threshold adjusting feature at steps 3675 and 3680. In this embodiment, jitter measurements taken at step 3515 over a predetermined sample period are temporarily stored.

For tuning the threshold T, the sampling period can be selected according to a period of time (e.g. 0.5 seconds, 1 second, 10 seconds, etc.), a predetermined numbers of packets, or some other parameter. For example, in an embodiment, each burst is a sampling period. In any case, the end of the sampling period is detected at step 3675 by an appropriate means, such as a clock, a packet counter, or by detecting whether the current packet is an end packet. At the end of the sampling period, the threshold is reset to a new value at step 3680 as a factor of the temporarily stored jitter measurements of step 3615, and the adjusted threshold is applied during the subsequent sampling period. For example, step 3680 can set the threshold to be equal or slightly exceed the highest single occurrence of jitter within a sampling period. In an embodiment, step 3680 can set the threshold to be equal to, or slightly exceeding, an average value of all jitter measurements from a given burst or other sampling period.

Additionally, the threshold T can be tuned as a factor of the average burst size. By measuring the size of audio bursts at step 3615, inclusively counting the number of packets the start to the end of an sampling period or audible burst, the buffer can begin to develop statistics for the average, maximum, and minimum burst size. As the average burst size increases in size, T can increase, while T can be decreased if the average burst is small. However, it is desirable to prevent T from exceeding a certain limit. If the average burst length is uncharacteristically long, such as multiple seconds, the buffering resulting from a high T value can lead to undesirably high latency effects.

The optional threshold-tuning feature provided by steps 3675 and 3680 helps to optimize the threshold T at a lowest level which can adequately buffer out jitter. In fact, an initial threshold T can be preset at a low value, such as 0 ms, 10 ms, etc., to be adjusted dynamically as network conditions dictate.

Figure 4A:
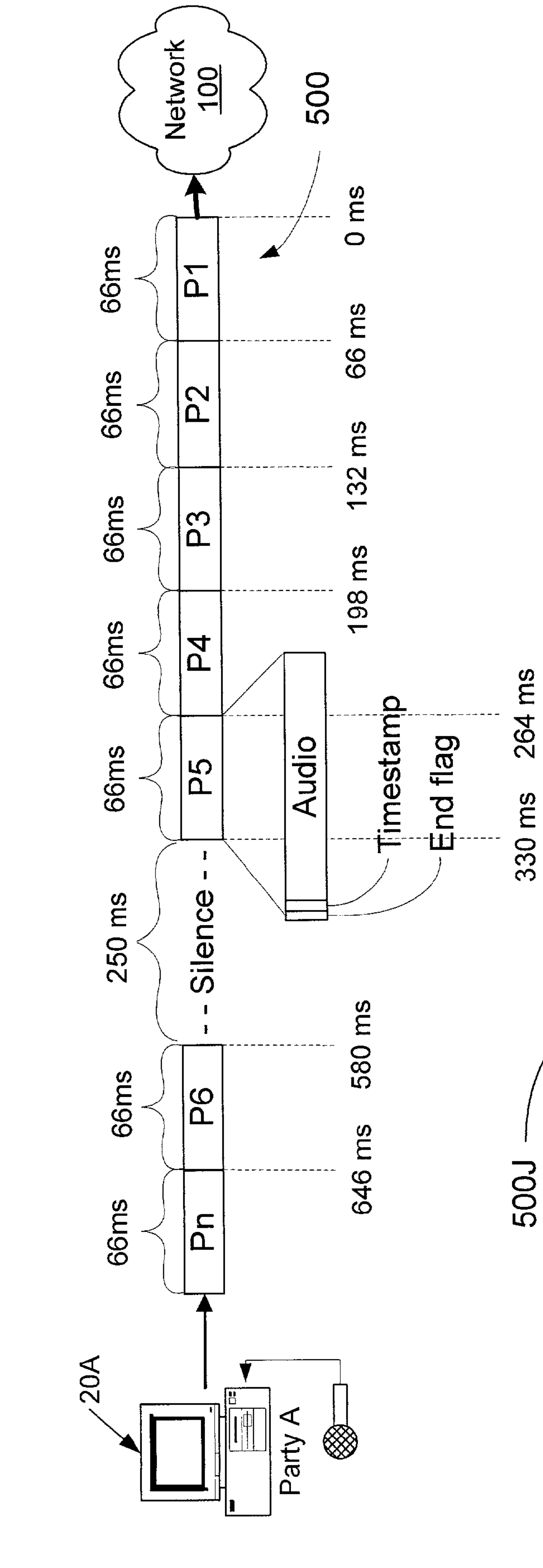
FIG. 4*a* is a schematic view of packets of audio data as transmitted from a sending computer over the network, an exemplary one of the packets illustrated in enlarged form to show header information.
Figure 4B:
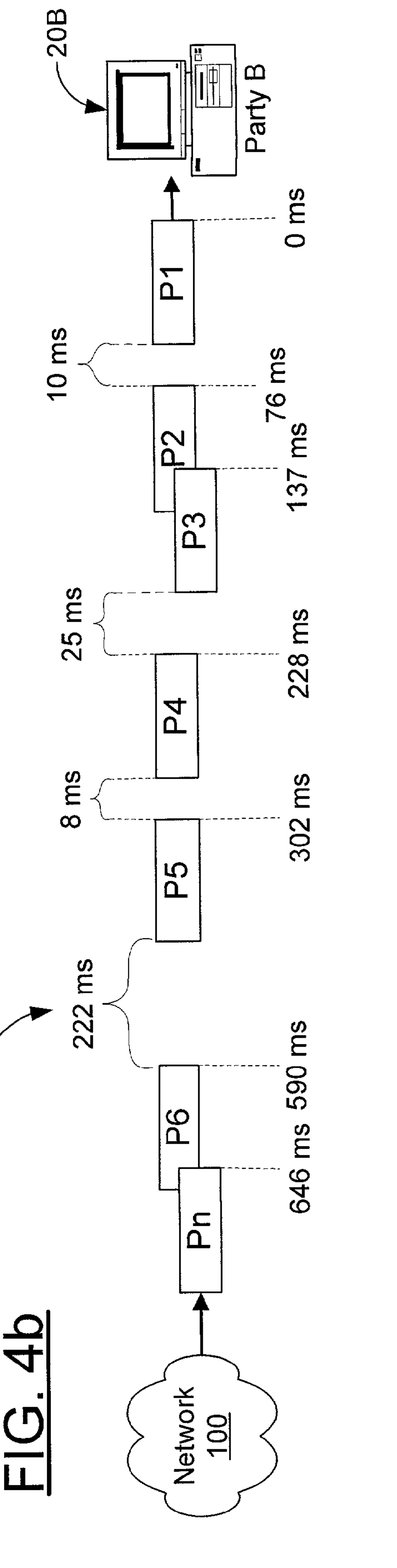
FIG. 4*b* is a schematic view of the packets of FIG. 4*a* as received from the network by the receiving party, the packets being "jittered" relative to the original stream of FIG. 4*a*.

Turning now to FIGS. 4*a* and 4*b*, the form of the audio packets will be explained. FIG. 4*a* illustrates an audio stream 500 including a series of audio packets P1–Pn as transmitted outwardly over the network 100 by a computer 20A of a sending party (Party A in this example), and FIG. 4*b* illustrates the packets P1–Pn as received from the network 100 by a computer 20*b* of a receiving party (Party B in this example).

First with reference to FIG. 4*a*, the packets represent uniform audio segments of 66 ms each. The packets can be created to include any length of audio, but 66 ms is a suitable exemplary length. Packets P1–P5 represent a burst of audio, followed by a period of silence which is, in turn, followed by packets P6–Pn. As created, the packets P1–Pn each represent audio beginning 66 ms from the start of the previous packet. For example, the first packet P1 begins at time 0 ms, the next packet p2 begins at time 66 ms, the third packet p3 begins at time 132 ms, the fourth packet P4 begins at time 198 ms, and so on. In the exemplary stream 500 of FIG. 4*a*, a silent period of 250 ms separates the originally created sound bursts P1–P5 and P6–Pn.

Still referring to FIG. 4*a*, packet P5 is illustrated in expanded detail to illustrate exemplary audio packet segments. In particular, each packet contains a segment of the actual audio data as well as header information. As labeled in FIG. 4*a*, the header in packet P5 includes a timestamp corresponding to the time at which the packet was created, as labeled accordingly in FIG. 4*a*. The header typically also includes appropriate protocol information, such as for T. 120, TCP and IP protocols.

So that a recipient will recognize the difference between audio bursts and silence, the sending computer additionally marks the header data with appropriate indicators. For example, as audio is captured, the first and/or last packet of each audio burst is marked. Silence presumably precedes a marked first packet, and silence presumably follows a marked last packet. In the exemplary buffering process described herein, the sending computer detects silence and designates the beginning of silence by placing an end flag in the last packet of the respective burst preceding the silence. In the embodiment of FIG. 4*a*, packet P5 is an end packet of the burst P1–P5, and accordingly, end packet P5 includes such an end flag. The end flag can consists of a single bit that is flipped in the header of the end packet of the burst. The end flag is maintained as the packet is subsequently processed for sending. In an embodiment, the first packet of each burst may contain a start flag, but such a start flag is optional in the real-time buffer described herein, because the next packet received after silence can be presumed to be the beginning of a new burst.

Now with reference to FIG. 4*b*, the packets P1–Pn are shown as received at computer 20B from the network 100 in an exemplary "jittered" manner as a jittered stream 500J. Jitter is essentially the deviation between the original timing of packets as created and the times at which packets are actually received.

If the packets P1–Pn were received by computer 30B without jitter, the packets would arrive at timing intervals equaling the clock timing of the originally created audio packets. In the present example, the packets would be respectively separated by 66 ms, as in the original stream 500 of FIG. 4*a*. In FIG. 4*b*, however, the packets P1–Pn of the jittered stream 500J are not received with the expected timing of 66 ms intervals. Instead of arriving 66 ms after the 0 ms clock beginning of the first packet P1, the second packet P2 has arrived at 76 ms—10 ms late—resulting in a 10 ms jitter at that point. Packet P3 has arrived at 137 ms, only 5 ms late relative to the expected (non-delayed) time of 132 ms. The fourth packet P4 has arrived at a clock time of 228 ms, 30 ms late relative to the expected P4 arrival time of 198 ms and separated by 25 ms from the end of packet P3. Packets P5 and P6 are also shown having arrived in a delayed manner, yet packet Pn has arrived on time.

If the audio burst P1–P5 was played with the jittered timing shown in FIG. 4*b*, the rendered sound include undesired bits of silence including the 10 ms gap between P1 and P2, the 25 ms gap between P3 and P4, and the 8 ms gap between P4 and P5. An audio burst which includes such non-original bits of silence has a low-quality character.

Figure 5:
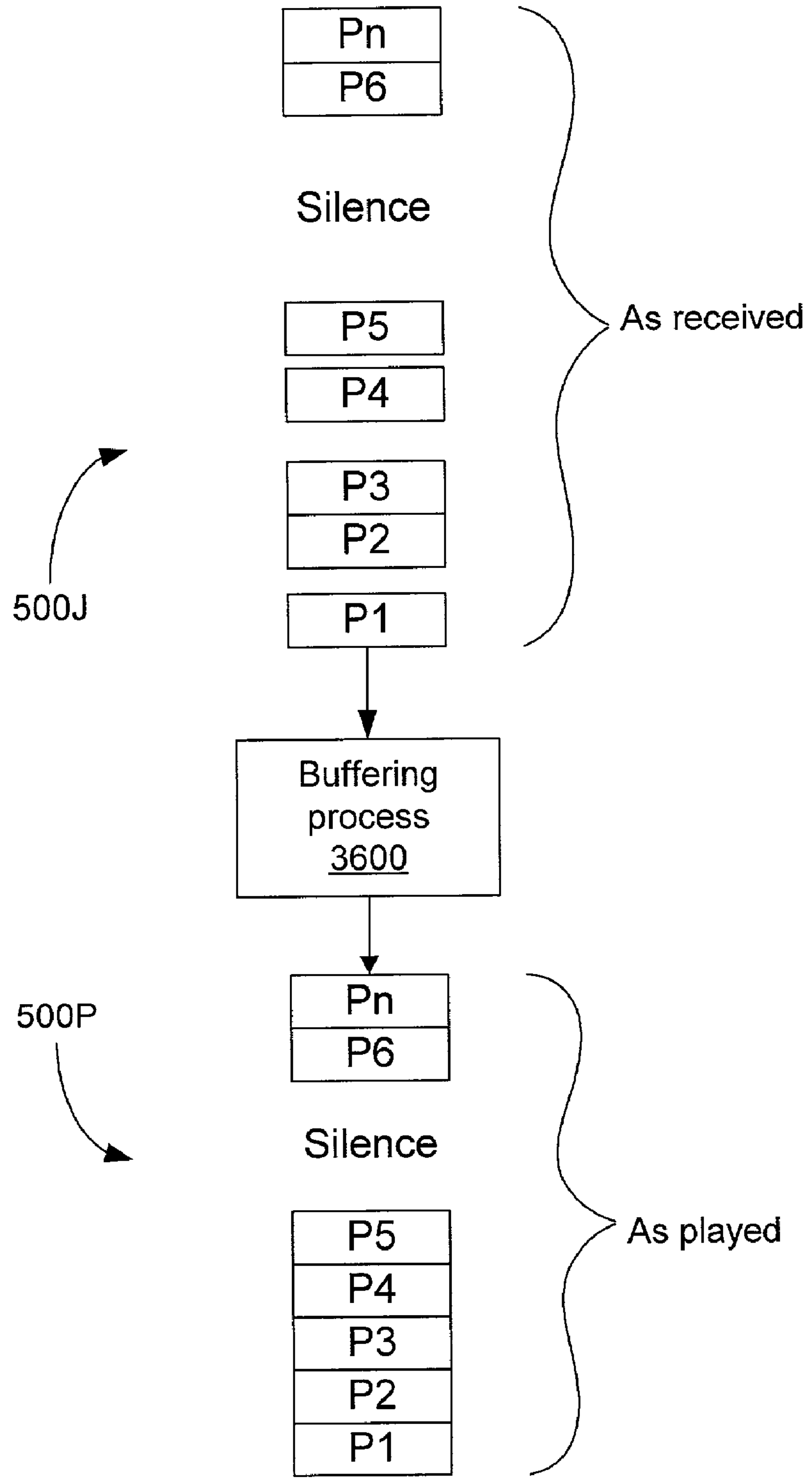
FIG. 5 is a schematic view of the jittered stream of FIG. 4*b* prior to and after the buffering process.

The buffering process 3600, described above in connection with FIGS. 3*a*–3*c* corrects jittered timing on a per-burst basis, allowing the burst to be played without the undesired bits of silence shown separating the packets in FIG. 4*b*. With reference to FIG. 5, the jittered audio stream 500J is shown prior to the buffering process 3600 and as played after buffering. As labeled in the upper portion of FIG. 5, the stream 500J includes delayed, jittered packets entering the buffering process 3600. In the played stream 500P as labeled in the lower portion of FIG. 5, the jitter has been removed. Additionally, the played stream 500P contains a period of silence between the two bursts P1–P5 and P6–Pn which is permitted to vary in duration with respect to the jittered stream 500J and the original stream 500 (FIG. 5*a*) according to the buffering process 3600.

Figures 6A, 6B, 6C, 6D, 6E, 6F, 6G:
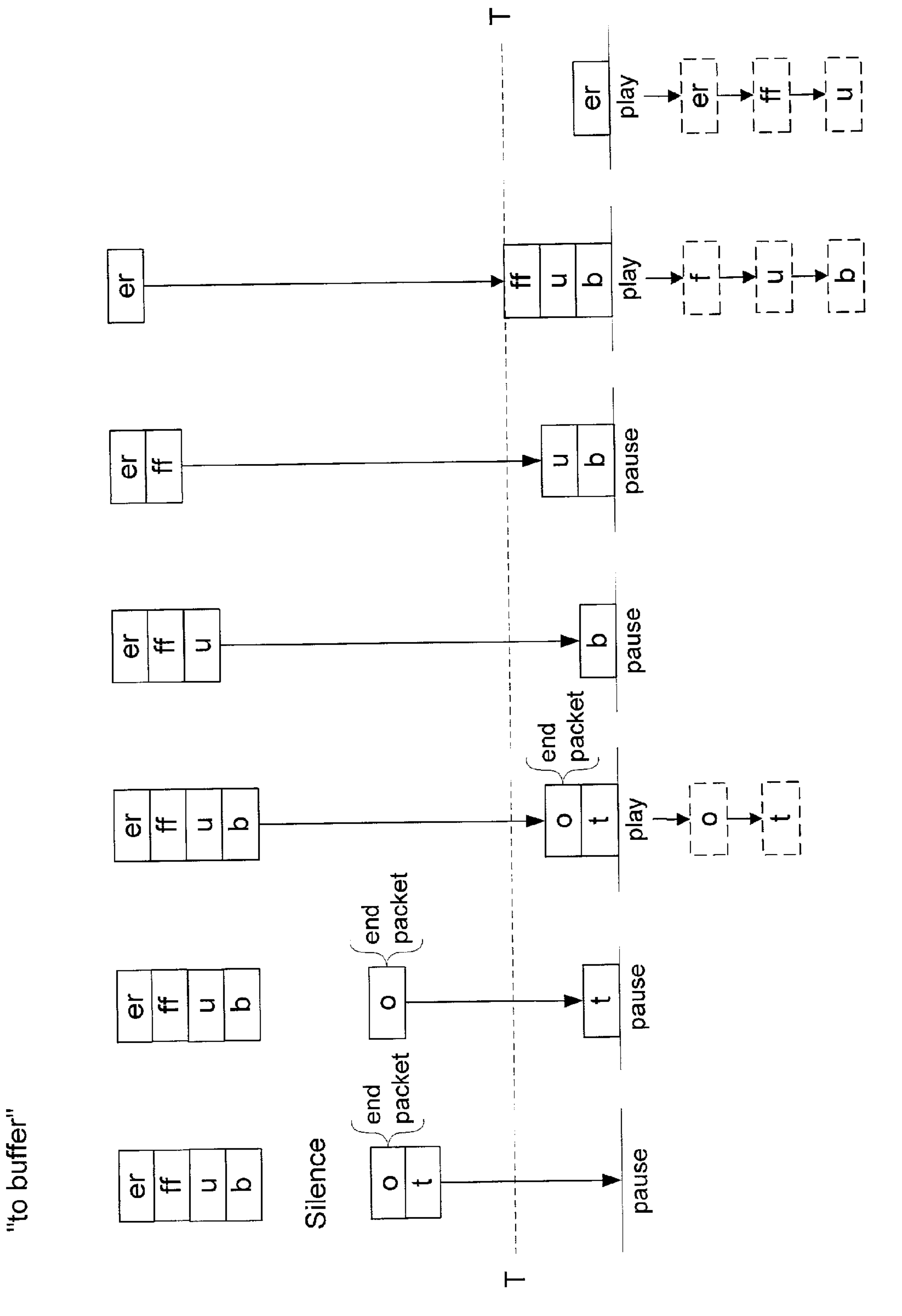
FIGS. 6*a*–6*g* illustrate a schematic example of the effect of the buffering process on packets comprising a pair of audio bursts represented by a spoken phrase "to buffer."

An effect of the buffering process on speech will now be described with reference to FIGS. 6*a*–6*g*. FIGS. 6*a*–6*b* present a generalized and simplified example of the effect of the buffering process on a phrase "to buffer." In the example, the phrase is includes a first burst "to" and a second burst "buffer," separated by silence. The first burst includes two packets, respectively representing the "t" and "o" sounds. Because the "o" packet precedes silence, the "o" packet is an end packet of the "to" burst, as indicated in FIGS. 6*a*–6*c*. The "o" packet has header information which contains an end flag. The second burst includes four packets, respectively representing the "b" "u" "ff" and "er" sounds. The "er" packet is also an end packet, but it has not been so labeled because the end packet feature will be explained in connection with the "o" packet for purposes of the instant example. It should be understood that an actual packetization of the phrase "to buffer" would likely include dozens of audio packets, and that the present example has been highly simplified for the sake of illustration.

In FIG. 6*a*, the packets comprising the "to buffer" audio stream are illustrated, an arrow indicating the transmission of the "t" packet to the buffer. In FIGS. 6*a*–6*g*, the dashed line represents the threshold T, the limit of the buffer.

When the "t" packet is received by the buffer, as shown in FIG. 6*b*, the buffer is initially in the "pause" mode (steps 3605 and/or 3665 of FIG. 3*b*), and accordingly, the "t" packet is held in the queue upon the subsequent arrival of the "o" packet, as shown in FIG. 6*c*. Any jitter between the delivered "t" and "o" packets is eliminated by waiting to play the "t" packet until the remainder of the burst has arrived. Because the "o" packet is an end packet, the "play" mode is initiated and the buffering process immediately releases the packets in the queue to be appropriately played out (steps 3660 and 3655 of FIG. 3*b*). More specifically, the "t" and "o" packets are forwarded to be played at a normal rate, as indicated in phantom lines below the buffer in FIG. 6*c*. The listener hears the entire "to" burst played as a result.

Notably, the entire "to" burst is less than the threshold T, and accordingly, the "to" burst played through the buffer even though the "t" and "o" packets did not fill the buffer.

The "b" packet is the start of the second burst, and the "b" packet is received by the buffer in FIG. 6*d*. Because the buffer is not full and the "b" packet is the start of a new burst, the buffer switches back to "pause" mode (steps 3665 and 3668 of FIG. 3*a*), holding the "b" packet. The "u" audio packet is received by the buffer in FIG. 6*e*, but the buffer remains in "pause" mode and waits for more packets to arrive before playing. In particular, the buffering process does not play any packets at this point because the "u" packet is not an end packet, and because the queued "b" and "u" packets are less than the buffer threshold T. At the stage of FIG. 6*e*, the paused period is heard by the listener as silence. This is advantageous because any jitter among the "b" packet, "u" packet, and/or the expected "ff" packet is eliminated by pausing the packets in the queue.

The arrival of the "ff" audio packet, shown in FIG. 6*f*, triggers the "play" mode of the buffer because the queued "b" "u" and "ff" packets meet or exceed the threshold T (step 3625 of FIG. 3*b*). As a result, the buffer releases all of the queued packets, including the "b" "u" and "ff" packets, to be played as indicated in phantom below the buffer in FIG. 6*f*.

Notably, the "er" packet of the "buffer" burst has not yet arrived when the buffer begins playing the "b" "u" and "ff" packets in FIG. 6*f*. To play the "b" "u" and "f" packets takes some time. For example, if the threshold T is set at a value which is a multiple of the packet size, playing the buffer contents will take T ms. It is expected that the remaining packet of the burst, i.e., the "er" packet, will arrive at the buffer before the "ff" has played out. The arrival of the "er" packet is shown in FIG. 6*g*, and no jitter will be heard by the recipient as long as the "er" packet arrived before the "ff" packet was played. Because the "er" packet is part of a burst which is already playing, the buffer remains in "play" mode and the "er" packet is immediately forwarded from the behind the earlier packets (step 3670 of FIG. 3*b*).

The original duration of the silent period between the "to" and "buffer" bursts is not directly relevant to duration of silence heard by the recipient between the buffered bursts. The buffering process 3600 begins to play each burst based upon other parameters, as discussed in detail in connection with FIG. 3*b*. Each burst can be shifted in time as much as the buffer threshold T relative to the other bursts.

If an unusually large period of jitter occurs, the buffering process 3600 safeguards against holding paused audio indefinitely through the maximum jitter time checking step at step 3672 of FIG. 3*b*. As an example with reference to FIGS. 6*e* and 6*f*, if an unusually lengthy jitter time occurs after the "u" packet before the arrival of the "ff" packet, the buffer will be eventually switched from "pause" mode to "play" mode when the delay of the "ff" packet exceeds the predetermined maximum time. As a result, the held "b" and "u" packets will be played, and the "ff" packet would be played upon its arrival. If the "ff" arrived after the "u" data had already been played, the listener would hear an audible delay between the "u" and "ff" packets, such as "to--bu---ffer."

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for buffering packets of audio data to reduce jitter, the audio data including a plurality of bursts of audio separated by silence, the method comprising the steps of:

adding at a receiving endpoint incoming packets of audio data to a buffer;

detecting at the receiving endpoint when the buffer contains an amount of audio data which matches a predetermined threshold amount;

upon detecting that the buffer contains an amount of audio data which matches a predetermined threshold amount, playing at the receiving endpoint the audio data contained in the buffer;

detecting at the receiving endpoint when a burst of audio has ended; and upon detecting that a burst of audio has ended, at the receiving endpoint:

playing the audio data contained in the buffer;

determining the amount of jitter accumulated in the last burst of audio; and stopping playback for a silent period based on the amount of accumulated jitter before playing subsequent bursts of audio.

2. The method of claim 1, wherein each of said bursts includes an end packet, wherein the step of detecting when a burst has ended comprises detecting an end packet.

3. The method of claim 2, wherein each end packet includes an end flag.

4. The method of claim 1, further comprising periodically adjusting the threshold.

5. The method of claim 4, further comprising:

periodically measuring a length of a burst; and resetting the threshold to a factor of the length of the most recently measured burst.

6. The method of claim 4, wherein the audio packets arrive during a series of sampling periods, further comprising:

measuring respective jitter times between packets received during a current sample period to determine a measured jitter amount;

calculating an adjusted threshold time as a factor of the measured jitter amount; and resetting the threshold to the adjusted threshold time to be applied during a subsequent sampling period.

7. The method of claim 6, wherein each sampling period is one of said bursts.

8. The method of claim 6, wherein each sampling period is a predetermined period of time.

9. The method of claim 6, the method further comprising setting the threshold at a default value during an initial sampling period.

10. The method of claim 6, wherein the calculating step includes determining an average jitter time between at least some of the packets in the sample period, the adjusted threshold time equaling at least the average jitter time.

11. The method of claim 10, wherein the adjusted threshold time equals more than the average jitter time.

12. The method of claim 6, further comprising repeating the measuring, calculating and resetting steps during each sampling period.

13. A computer-readable medium having computer-executable instructions for a method of buffering packets of audio data to reduce jitter, the audio data including a plurality of bursts of audio separated by silence, the method comprising:

adding at a receiving endpoint incoming packets of audio data to a buffer; and while not currently playing audio data, upon detecting that the buffer contains an amount of audio data which matches a predetermined threshold amount, playing at the receiving endpoint the audio data contained in the buffer; and upon detecting that a burst of audio has ended, at the receiving endpoint:

playing the audio data contained in the buffer;

determining the amount of jitter accumulated in the last burst of audio; and stopping playback for a silent period based on the amount of accumulated jitter before playing subsequent bursts of audio.

14. The computer readable medium of claim 13, wherein each of said bursts includes an end packet, wherein the step of detecting when a burst has ended comprises detecting an end packet.

15. The computer readable medium of claim 14, wherein each end packet includes an end flag.

16. The computer readable medium of claim 13, the method further comprising periodically adjusting the threshold.

17. The computer readable medium of claim 16, the method further comprising:

periodically measuring a length of a burst; and resetting the threshold to a factor of the length of the most recently measured burst.

18. The computer readable medium of claim 16, wherein the audio packets arrive during a series of sampling periods, further comprising:

measuring respective jitter times between packets received during a current sample period to determine a measured jitter amount;

calculating an adjusted threshold time as a factor of the measured jitter amount; and resetting the threshold to the adjusted threshold time to be applied during a subsequent sampling period.

19. The computer readable medium of claim 18, wherein each sampling period is one of said bursts.

20. The computer readable medium of claim 18, wherein each sampling period is a predetermined period of time.

21. The computer readable medium of claim 18, the method further comprising setting the threshold at a default value during an initial sampling period.

22. The computer readable medium of claim 18, wherein the calculating step includes determining an average jitter time between at least some of the packets in the sample period, the adjusted threshold time equaling at least the average jitter time.

23. The computer readable medium of claim 22, wherein the adjusted threshold time equals more than the average jitter time.

24. The computer readable medium of claim 18, the method further comprising the measuring, calculating and resetting steps during each sampling period.

* * * * *